United States Patent
Duke

(10) Patent No.: US 8,421,260 B2
(45) Date of Patent: Apr. 16, 2013

(54) HYDROKINETIC TURBINE FOR LOW VELOCITY CURRENTS

(76) Inventor: John Hincks Duke, Providence, RI (US)

(*) Notice: Subject to any disclaimer, the term of this patent is extended or adjusted under 35 U.S.C. 154(b) by 310 days.

(21) Appl. No.: 12/804,239

(22) Filed: Jul. 19, 2010

(65) Prior Publication Data

US 2012/0013128 A1  Jan. 19, 2012

(51) Int. Cl.
F03B 13/00 (2006.01)
H02P 9/04 (2006.01)

(52) U.S. Cl.
USPC ........................................................ 290/54

(58) Field of Classification Search .................. 290/54
See application file for complete search history.

(56) References Cited

U.S. PATENT DOCUMENTS

| | | | | |
|---|---|---|---|---|
| 229,270 A * | 6/1880 | Perkins | ...................... | 416/238 |
| 1,729,277 A * | 9/1929 | Rodgers | ...................... | 416/238 |
| 2,501,696 A * | 3/1950 | Souczek | ...................... | 290/43 |
| 3,209,156 A * | 9/1965 | Struble, Jr. | ...................... | 290/54 |
| 3,986,787 A * | 10/1976 | Mouton et al. | ...................... | 415/7 |
| 4,151,424 A * | 4/1979 | Bailey | ...................... | 290/54 |
| 4,258,271 A * | 3/1981 | Chappell et al. | ...................... | 290/54 |
| 4,722,665 A * | 2/1988 | Tyson | ...................... | 416/84 |
| 4,849,647 A * | 7/1989 | McKenzie | ...................... | 290/54 |
| 5,137,417 A * | 8/1992 | Lund | ...................... | 415/4.1 |
| 6,091,161 A * | 7/2000 | Dehlsen et al. | ...................... | 290/43 |
| 6,168,373 B1 * | 1/2001 | Vauthier | ...................... | 415/7 |
| 6,409,466 B1 * | 6/2002 | Lamont | ...................... | 415/3.1 |
| 6,531,788 B2 * | 3/2003 | Robson | ...................... | 290/43 |
| 6,717,285 B2 * | 4/2004 | Ferraro | ...................... | 290/55 |
| 7,199,484 B2 * | 4/2007 | Brashears | ...................... | 290/54 |
| 7,291,936 B1 * | 11/2007 | Robson | ...................... | 290/43 |
| 7,492,054 B2 * | 2/2009 | Catlin | ...................... | 290/54 |
| 7,737,570 B2 * | 6/2010 | Costin | ...................... | 290/43 |
| 7,887,283 B1 * | 2/2011 | Mongan | ...................... | 415/2.1 |
| 7,939,957 B2 * | 5/2011 | Costin | ...................... | 290/54 |
| 8,102,071 B2 * | 1/2012 | Catlin | ...................... | 290/54 |
| 8,237,304 B2 * | 8/2012 | Dehlsen et al. | ...................... | 290/54 |
| 2002/0036407 A1 * | 3/2002 | Ferraro | ...................... | 290/5 |
| 2002/0088222 A1 * | 7/2002 | Vauthier | ...................... | 60/398 |
| 2007/0007772 A1 * | 1/2007 | Brashears | ...................... | 290/43 |
| 2007/0241566 A1 * | 10/2007 | Kuehnle | ...................... | 290/53 |
| 2010/0164230 A1 * | 7/2010 | Belinsky et al. | ...................... | 290/54 |
| 2010/0181774 A1 * | 7/2010 | Dehlsen et al. | ...................... | 290/54 |
| 2010/0221112 A1 * | 9/2010 | Bevirt et al. | ...................... | 416/135 |
| 2010/0230546 A1 * | 9/2010 | Bevirt et al. | ...................... | 244/175 |
| 2010/0283253 A1 * | 11/2010 | Bevirt | ...................... | 290/55 |
| 2010/0295303 A1 * | 11/2010 | Lind et al. | ...................... | 290/44 |
| 2010/0295320 A1 * | 11/2010 | Bevirt et al. | ...................... | 290/55 |
| 2010/0295321 A1 * | 11/2010 | Bevirt | ...................... | 290/55 |

(Continued)

*Primary Examiner* — Pedro J Cuevas

(57) ABSTRACT

A hydrokinetic turbine is adapted to slow water energy conversion to avoid adverse environmental impact on tidal flushing. It combines a large bulbous upstream hub with a peripheral array of current deflectors downstream of the hub. The deflectors are analogous to delta plane wings at high angle of attack, but here are oriented to cause both tangential and radially inwards angular acceleration of ambient flow. Torque develops in reaction to these angular accelerations, in contrast to Bernoulli effect lift on high aspect ratio foil sections that require high surface flow speeds. The fluid accelerations further combine to form a vortex in the turbine's turbulent wake, which draws additional water through the deflector array. In one embodiment, the deflectors' support members pivot about their inner ends in the mode of a rotary kite that may economically project a resilient structure over a very large area. In another embodiment, the entire turbine may submerge to permit passage of deep draft commercial shipping traffic.

7 Claims, 7 Drawing Sheets

U.S. PATENT DOCUMENTS

Figure 1:
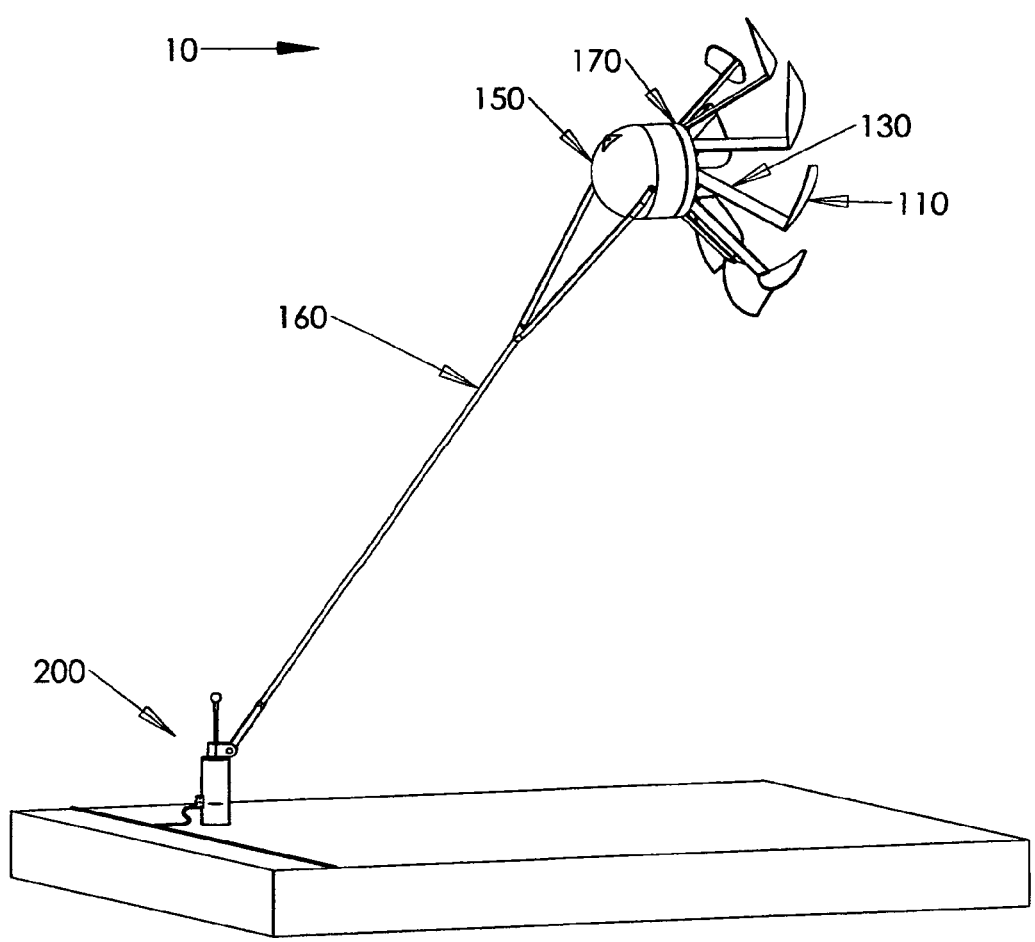

| | | | |
|---|---|---|---|
| 2011/0095530 A1* | 4/2011 | Blumer et al. | 290/43 |
| 2011/0121570 A1* | 5/2011 | Bevirt et al. | 290/44 |
| 2011/0127775 A1* | 6/2011 | Bevirt | 290/55 |
| 2011/0148117 A1* | 6/2011 | Bailey | 290/52 |
| 2011/0192938 A1* | 8/2011 | DiMarzio et al. | 244/53 R |
| 2012/0074704 A1* | 3/2012 | Rooney | 290/54 |
| 2012/0076656 A1* | 3/2012 | Abass | 416/176 |
| 2012/0292911 A1* | 11/2012 | Bolin | 290/54 |

* cited by examiner

EBB            SLACK            FLOOD

HYDROKINETIC TURBINE FOR LOW VELOCITY CURRENTS

1. BACKGROUND OF THE INVENTION

The need to secure renewable sources of energy extends to what covers most of Earth's surface. Yet this potential, in the ocean, remains largely untapped. It consists of wind driven and tidal currents, thermal and salinity potentials, and waves. Of these, tidal power has distinct near-term economic potential because many concentrated electricity markets are in cities that developed in tideways. There is also long-recognized potential in near-shore ocean currents, such as the Florida Current. In the long-term, the eastward Pacific Equatorial Undercurrent (EUC) holds promise because its enormous scale spans one third of Earth's circumference. The EUC flows below both the overlying westward South Equatorial Current (SEC) and prevailing westward trade winds, so kinetic energy in these opposing flows may be captured without deep ocean mooring expense.

The objective of this invention is economic conversion of hydrokinetic energy from slow currents of less than 1.5 m/s. This will allow placement of tidal turbines outside of high speed "bottleneck" locations that constrain tidal flushing of inshore waters. Where urban demand for electricity is greatest, this environmental constraint is significant due to waste discharge and industrial legacy. To minimize this adverse effect, the present Electric Power Research Institute (EPRI) US resource assessment (Bedard et al., 2006) limits usable energy at such sites to only 15% of their full hydrokinetic potential. Targeting slow water energy therefore both alleviates the environmental impact and expands the usable resource. There is also considerable low energy density tidal resource in non-estuarine open continental shelf areas. Interestingly, Arbic and Garrett (2009) provide a resonance analysis of open ocean/continental shelf dynamics which shows that an increase in friction on a near-resonant shelf can lead to an increase in ocean tides, so targeted low energy density conversion may actually increase the tidal resource base. With respect to ocean current hydrokinetic potential, the Florida Atlantic University Florida Current survey (Driscoll et al. 2009) indicates annual average velocity less than 1.5 m/s at 50 m depth. Velocity in the core of the EUC is less than 1.25 m/s. Economic utilization of lower energy density resource will also expand run-of-river hydroelectric potential.

2. SUMMARY OF THE INVENTION

To achieve the above goal of slow water energy extraction, here I describe a hydrokinetic turbine whose related embodiments may be optimized for flows between 1.0 and 1.5 m/s. Its unifying design principle develops rotary power by reaction to induced angular acceleration of the water mass stream. This is in contrast to Bernoulli effect lift on high aspect ratio foil sections that require high surface flow speeds. In this respect it is analogous to the 90% efficient Francis hydroelectric contained flow turbine, in which internal flow is deflected by nearly 180°, but here is adapted to the special case of Betz limited ambient flow.

Many examples of hydrokinetic turbines incorporate an external duct structure with an enlarged upstream and/or downstream opening to concentrate energy in way of the turbine blades. Instead, the present invention incorporates an enlarged bulbous hub that divides upstream flow. This also accelerates flow by conservation of mass, but is more economically engineered as a spherical or conical structure requiring no ancillary support. Significantly, the hub's large diameter relative to the machine's outer diameter permits economic direct drive power generation or reduced gearbox expense. The hub's interior volume also provides space for known ballast control means that does not otherwise increase downstream drag force.

The turbine's rotor supports a peripheral circular array of current deflectors located where velocity in the wake of the upstream bulbous hub is greatest. The deflectors are modified delta-planes at high angle of attack, which are known to develop lift by a combination of impulse force on the high pressure side and leading edge vortex effect on the low pressure side. Note that high angle of attack delta plane wings are generally considered inefficient in free flight applications because their lift/drag ratio is low (drag consumes fuel). But the present application of ambient flow power generation is not free flight, but rather a form of rotary tethered flight in which downstream drag is opposed by anchor load at low cost. This suggests a different paradigm of efficiency, which seeks to maximize torque with less regard for attendant downstream drag.

The combination of upstream bulbous hub with peripheral delta plane deflectors is further distinguished by the deflectors' compound pitch. In addition to pitch about radial axes (as by conventional propellers), the deflectors are pitched inwards so that flow initially turned outwards by the upstream hub is then re-deflected inwards. This increases torque-producing impulse on the high-pressure side of the deflectors. In the low velocity embodiment described below, this impulse also serves to open the peripheral deflector array in a rotary kite mode that eliminates cantilever load at the inner ends of its support members.

The above inward stream deflection is analogous to downwash from delta plane aircraft in high angle of attack landing mode. These streams collectively organize a trailing reaction vortex in the otherwise turbulent wake of the bulbous hub. Low pressure in the core of this vortex then acts to draw more water through the deflector array. As a rotational reaction to what drives the generator, the vortex strengthens as the turbine generates more power.

In comparison to externally ducted turbines, the above arrangement concentrates energy at a longer moment arm from the axis of rotation, so it develops more torque. This configuration also avoids additional tidal energy dissipation by external duct support structures, which is significant where resource use is limited by adverse tidal flushing impact.

Flow initially divided by the upstream bulbous hub is not only turned inwards by the deflector array, but also impinges upon parallel flow surrounding the turbine, so energy outside the projected area of the device also acts to concentrate flow in way of the deflectors. In other words, the parallel ambient flow acts as virtual external duct to the diverging stream.

Torque producing lift developed in the above way is not compromised by cavitation. Cavitation that may occur is not in contact with the wing surface, so is it is not erosive.

The specification below describes three embodiments of the turbine. A first embodiment is adapted to resiliently maximize deflector area in the mode of a rotary kite in slower velocity sites. A second embodiment is adapted in smaller scale for faster velocity sites, and a third embodiment adapts the second to a cross-stream linear array of counter-rotating pairs.

REFERENCES CITED

Arbic, B. K., and Garrett, C., A coupled oscillator model of shelf and ocean tides, Continental Shelf Research, doi: 10.1016/j.csr.2009.07.008, 2009.

Bedard, R., Previsic, M., Polagye, B., and Casavant, A., North America Tidal In-Stream Energy Conversion Technology Feasibility Study, EPRI TP-008-NA, 2006.

Driscoll, F. R., Skemp, S. H., Alsenas, G. M., Coley, C. J., and Leland, A., Florida's Center for Ocean Energy Technology, Publication of Florida Atlantic University, 2009.

3. SPECIFICATION

FIG. 1 shows the slow Water embodiment of the turbine in an operating configuration submerged in a current 10. A vertically pivotal and dis-connectable connector 200 links the sea floor to a first end of a rigid tether 160. A buoyant hub 150 pivotably connects to a second end of tether 160 so hub 150 may pitch about an axis approximately coincident With both its center of buoyancy and longitudinal axis. Hub 150 further provides internal ballast that maintains horizontal trim of its longitudinal axis. Tether 160 further provides internal rotation in its longitudinal axis so hub 150 may yaw. The upstream end of hub 150 is convex. The downstream end of hub 150 pivotably connects to a rotor 170 that is driven about the longitudinal axis of hub 150 by a set of approximately neutrally buoyant spokes support members 130 to generate power by known means. Each spoke 130 connects to an approximately neutrally buoyant deflector 110. The downstream surface of rotor 170 is substantially a transverse plane.

Figure 2:
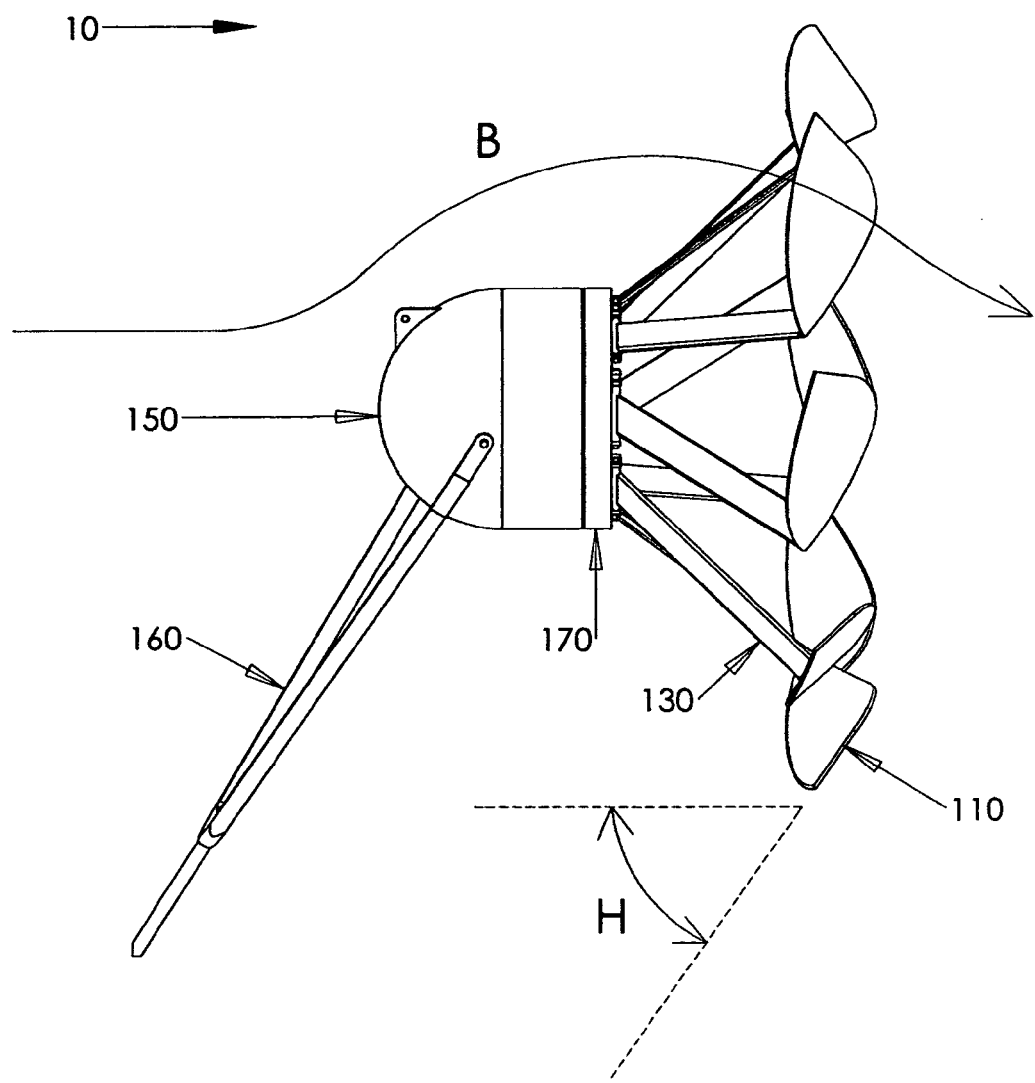

FIG. 2 shows a side view of the turbine indicating an inward pitch angle H between the longitudinal axis of hub 150 and the faces of deflectors 110. A streamline B indicates initial radial divergence of current 10 around the convex upstream end of hub 150, followed by radial convergence by deflectors 110. In three dimensions convergence of multiple streamlines B form a reaction vortex in the turbulent wake of hub 150.

Figure 3:
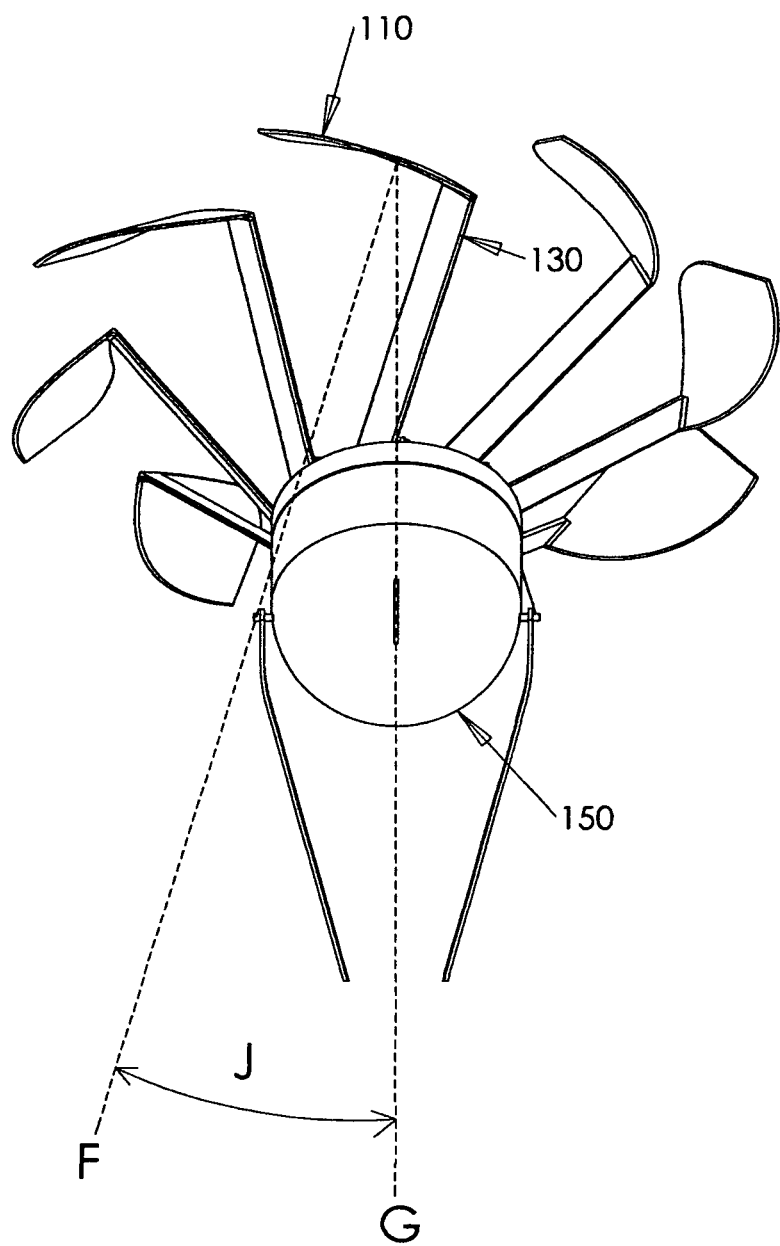

FIG. 3 is a view approximately at angle H to the longitudinal axis of hub 150 that indicates a pitch angle J between a vector F substantially normal to the face of a deflector 110 and a vector G in the plane of the longitudinal axis of hub 150. The shape of deflectors 110 approximate a half of the known delta wing form, but may be curved to better conform to their conical sweep. The cross-stream projected area of deflectors 110 exceeds that of spokes 130.

Figure 4:
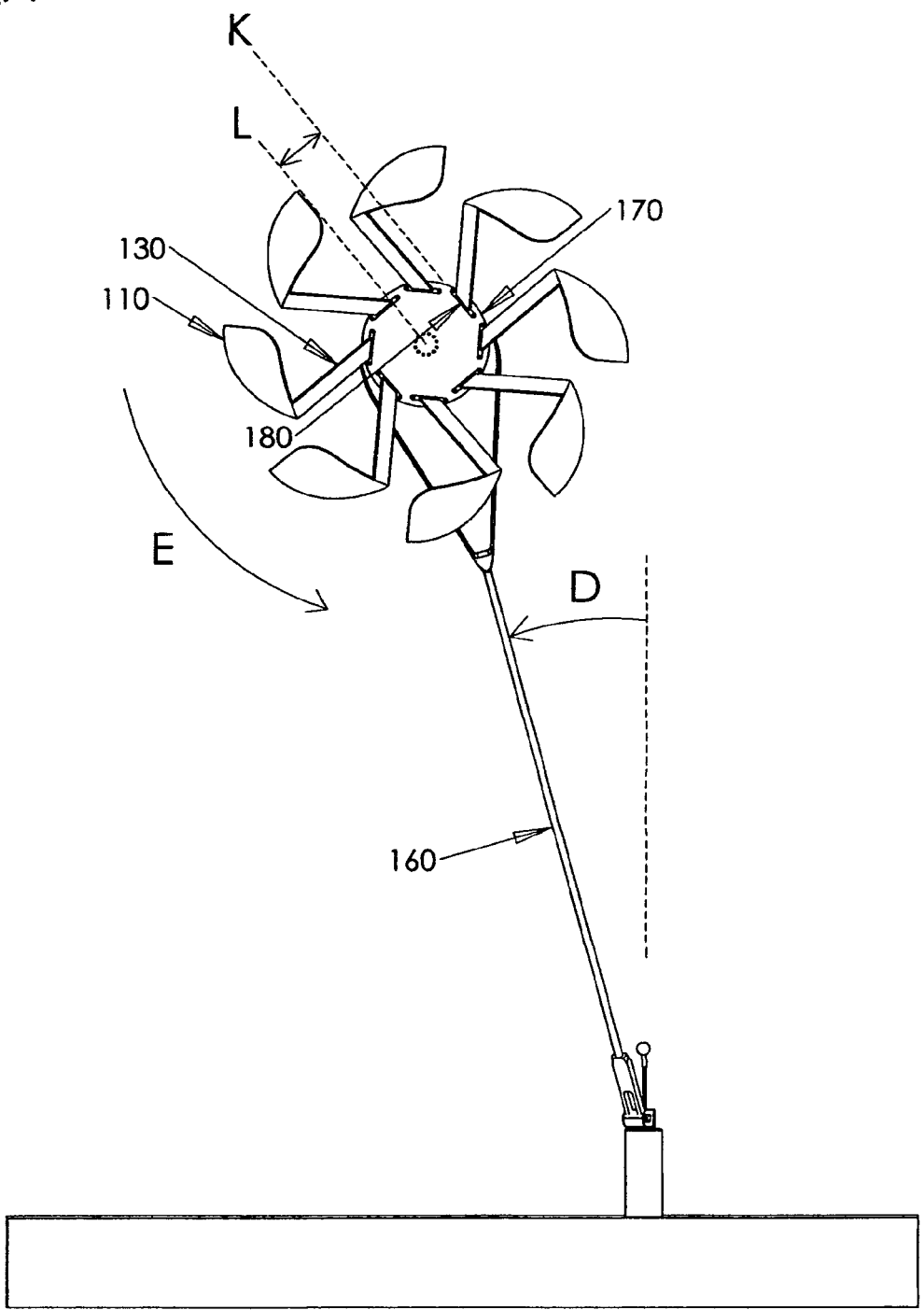

FIG. 4 provides an upstream view indicating an operating direction of rotation E of the turbine. In this embodiment, a set of hinges 180 pivotably attach the central ends of spokes 130 to rotor 170 about an axis K that is offset from the center of rotor 170 by a distance L. The reaction torque to power generation in hub 150 causes a cross-stream deflection angle D of tether 160.

Figure 5:
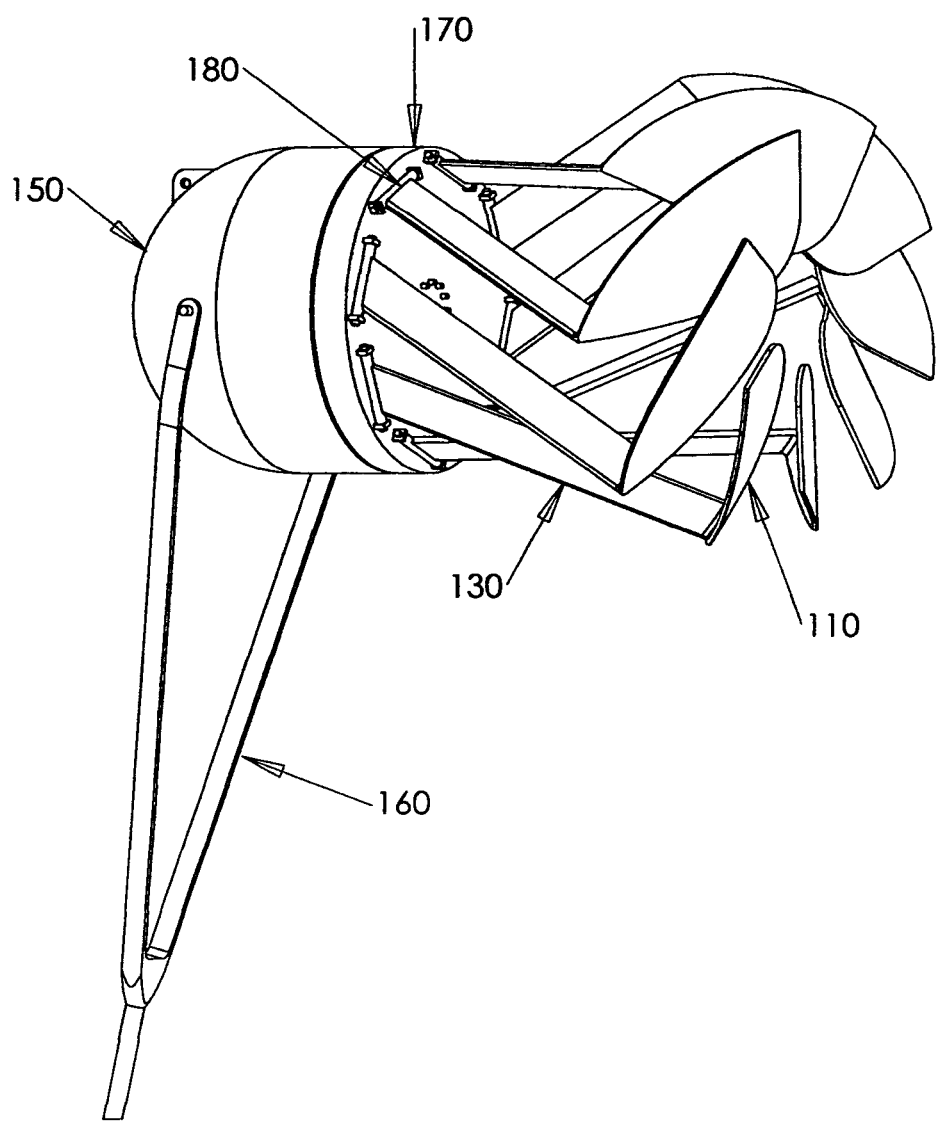

FIG. 5 shows this embodiment where spokes 130 and deflectors 110 rotate about hinges 180 to a non-operating configuration.

Figure 6:
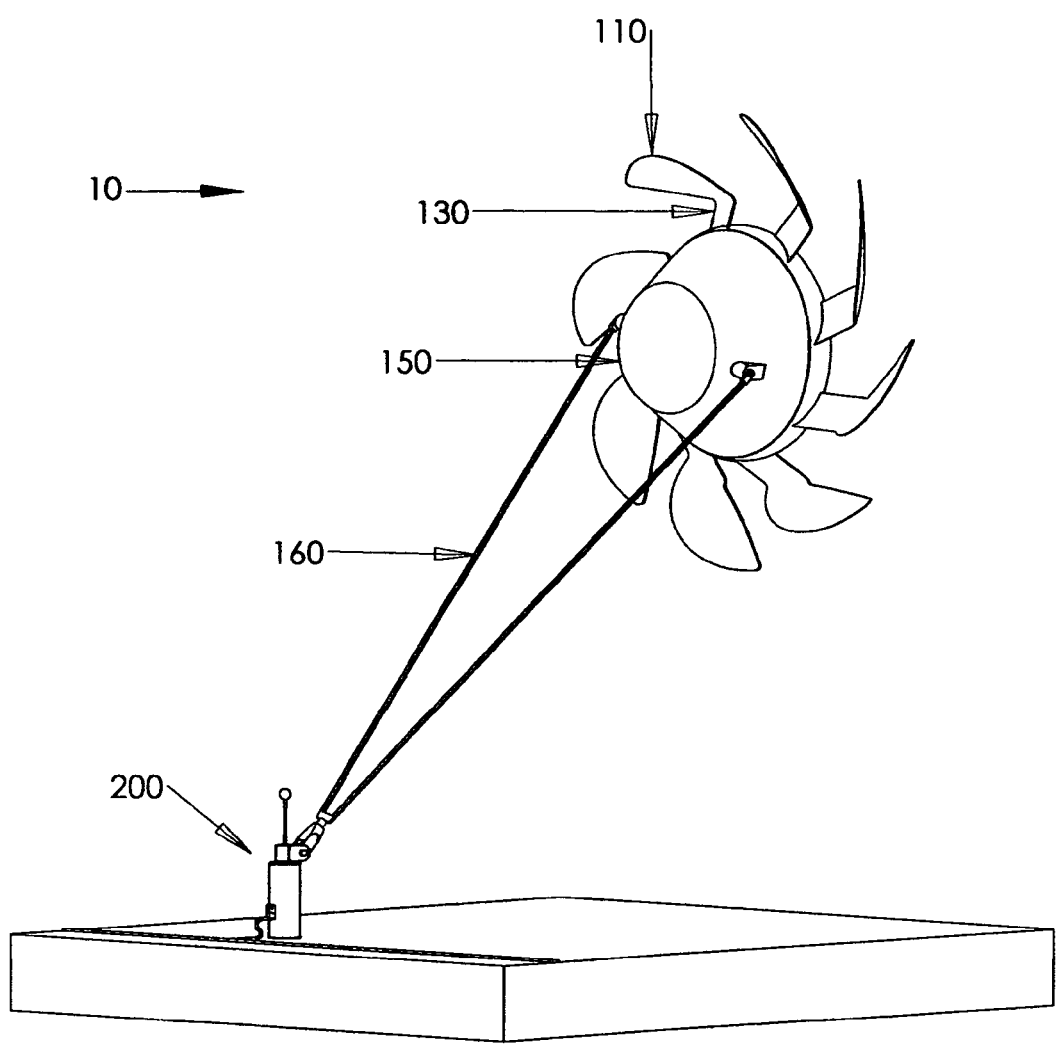

FIG. 6 is a perspective view of a second embodiment in which spokes 130 are shorter and rigidly connect to rotor 170.

Figure 7:
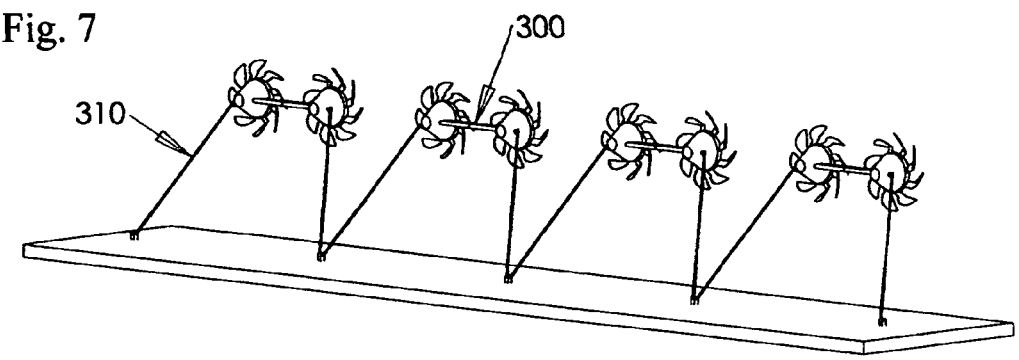

FIG. 7 illustrates a third embodiment in which a beam 300 joins hub 150 of pairs of counter-rotating turbines. A set of flexible tethers 310 share common seafloor connections in a linear cross-stream array of such pairs. In this embodiment, the center of buoyancy of hub 150 is incrementally downstream of the tether 310 axis of attachment to hub 150.

Figure 8:
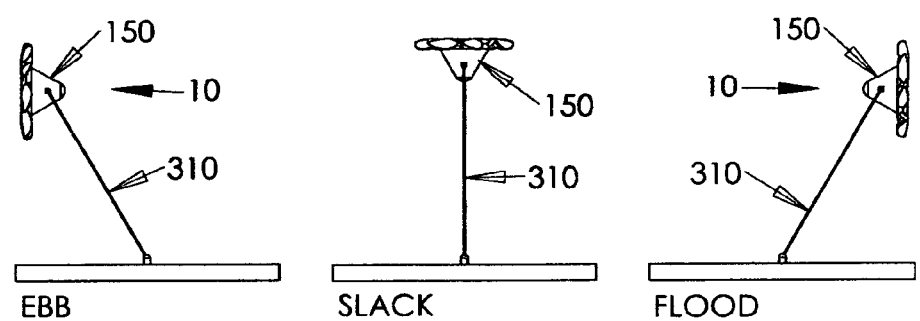

As shown in the side view of FIG. 8, this buoyancy offset maintains the turbine's horizontal trim in operation where current speeds diminish with depth and provides vertical turbine orientation during slack water.

Figure 9:
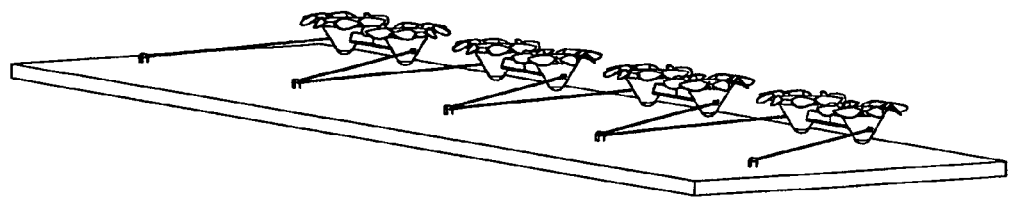

FIG. 9 shows such a linear array with hub 150 flotation means flooded for submersion in way of deep draft commercial shipping traffic.

4. OPERATION

For the first embodiment, a support vessel not shown tows the turbine to sea in the non-operating configuration of FIG. 5. Hub 150 may be pre-ballasted to submerge the machine in transit. When in position, the vessel lowers tether 160 to secure sea-floor connection 200. When so connected, an electrical signal causes displacement of water from hub 150. Than a momentary grid controlled motored acceleration of rotor 170 in direction E results in a tangential force on spokes 130 and deflectors 110. With reference to FIG. 4, this force causes a rotation of hinges 180 that decreases angle H as the downstream ends of spokes 130 diverge. At a transitional angle H, the kite-wise reaction of wings 110 to current 10 is sufficient to maintain spoke 130 downstream divergence. Grid control then switches the turbine to its generating mode. To recover the turbine, a momentary grid controlled motored acceleration of rotor 170 opposite direction E results in a reversal of flow across wings 110, which rotates hinges 180 to the configuration of FIG. 5. Grid control then reduces buoyancy of ballast hub 150 and the support vessel retrieves the turbine to tow inshore for service.

Acceleration of fluid contacting deflectors 110 is the result of both divergence of flow 10 around hub 110 and low pressure within the core of the trailing reaction vortex.

In open water tidal sites the above first embodiment may rotate continuously about connector 200 to follow veering currents. The rotary kite configuration provides a resilient structure able to deform and resolve itself in transient eddies. In the second and third embodiments hub 150 rotates about the tether attachment axis in transition from ebb to flood tide.

I claim:

1. A device that extracts energy from a moving ambient fluid comprising
    a central upstream coaxial hub and rotor assembly and
    a concentric array of spokes that separate said rotor from a concentric peripheral array of compound pitch deflector surfaces,
    where said spokes attach to said rotor at their inner ends and attach to said deflector surfaces at their outer ends, and
    where each said deflector surface is firstly pitched inward about a transverse axis so that the portion of that deflector surface closest to the central longitudinal device axis is downstream of the portion of that deflector surface farthest from the central longitudinal device axis and
    where each said deflector surface is secondly pitched about an axis that is both substantially within that deflector surface and a longitudinal plane through the central longitudinal device axis.

2. The device of claim 1 in which said hub and rotor assembly has a convex upstream end and a substantially flat downstream surface that is substantially perpendicular to the central longitudinal device axis.

3. The device of claim 1 in which operating fluid reactions to said compound pitch deflector surfaces form a vortex downstream of said hub and rotor assembly.

4. The device of claim 1 in which the transverse diameter of said hub is greater than one seventh the transverse diameter of the device.

5. The device of claim 1 in which said spokes pivotably attach to the downstream surface of said rotor, where the pivot axis of each said attachment is substantially perpendicular to a radius of said rotor that intersects that attachment.

6. The device of claim 1 in which the projected crosstream area of said deflector surfaces is greater than the projected cross-stream area of said spokes.

7. The device of claim 1 in which a tether means restraining the device pivotably attaches to said hub in an axis substantially coincident or upstream of the center of buoyancy of the device when immersed in said fluid.

* * * * *